United States Patent [19]

Baba et al.

[11] Patent Number: 4,698,632
[45] Date of Patent: Oct. 6, 1987

[54] RADAR DETECTOR

[75] Inventors: Yoshihiko Baba, Noda; Masahiko Yamaguchi, Matsudo, both of Japan

[73] Assignee: Uniden Corporation, Ichikawa, Japan

[21] Appl. No.: 746,384

[22] Filed: Jun. 19, 1985

[30] Foreign Application Priority Data

Jun. 19, 1984 [JP] Japan .................. 59-124474

[51] Int. Cl.⁴ .............................. G01S 7/36
[52] U.S. Cl. ........................ 342/17; 342/16
[58] Field of Search .............. 343/18 E, 7 A, 5 R; 375/108, 93, 97, 98; 455/229; 342/16, 17, 90, 89, 100

[56] References Cited
U.S. PATENT DOCUMENTS 4,280,223 7/1981 Roettele et al. ............ 343/18 E
4,318,103 3/1982 Roetele et al. ............ 343/18 E Primary Examiner—Thomas H. Tarcza
Assistant Examiner—Donald E. Hayes, Jr.
Attorney, Agent, or Firm—Oblon, Fisher, Spivak, McClelland, & Maier

[57] ABSTRACT

A radar detector capable of discriminating a prescribed radar signal from other undesired radar or interference signals by mixing an incoming electromagnetic wave radar signal with a local signal whose frequency varies with time within a fixed range of frequency repeatedly at regular periods, thus providing a beat signal; temporarily stopping the frequency sweep in response to appearance of dc components alone in the beat signal when the incoming radar signal matches the local signal in frequency; and watching the length of time for which the incoming radar signal matches the local signal in frequency. The reception of the prescribed radar signal is indicated using a sound-generating unit such as a speaker or a light-emitting unit.

8 Claims, 10 Drawing Figures

RADAR DETECTOR

FIELD OF THE INVENTION

The present invention relates generally to a radar detector, and more particularly to a radar detector which is designed to perform the function of identification of one or more prescribed radars by discriminating a beam of radio-frequency energy transmitted by said prescribed radar and by eliminating all other interference signals which enter the radar detector.

BACKGROUND OF THE INVENTION

Recently radars are being increasingly used for the purpose of detecting and finding the range and speed of moving objects by transmitting a beam of radio frequency or microwave energy in the general direction of the object. Radar detectors have been accordingly used for the purpose of checking whether or not a prescribed radar is actually radiating a beam of radio-frequency energy.

There are a variety of types of radar detectors. All of these radar detectors are liable to be adversely affected by noise signals in the form of pulses. False detections by a radar detector are often caused by signals of radio-frequency energy transmitted by other nearby radar detectors which run on the same signal-receiving principle. Also, there is a relatively high probability of false discrimination being caused by interpreting of a microwave beam transmitted by one of the prescribed radars for another microwave beam transmitted by a radar other than a prescribed one.

In an attempt to eliminate such false discrimination a variety of anti-malfunction circuits have been proposed. Most of these anti-malfunction circuits use a digital type discriminator for discriminating the prescribed beam of radio frequency energy from among others. The digital type discriminator, however, is complicated in structure, and expensive.

Also, disadvantageously a digital type discriminator does not work when the frequency of an interference signal fluctuates with a period which is an integer multiple of the local frequency sweeping period. Radar detectors equipped with a digital type discriminator tend to have reduced sensitivity in detecting signals of very small energy. For these reasons conventional radar detectors are not satisfactory.

OBJECTS OF THE INVENTION

One object of the present invention is to provide a radar detector which is capable of selecting a beam of radio frequency energy transmitted by a prescribed radar from among noise signals in the form of pulses and other interference signals transmitted by radar detectors other than one of the prescribed ones.

Another object of the present invention is to provide a radar detector of simple and inexpensive structure.

SUMMARY OF THE INVENTION

To attain the above objects a radar detector according to the present invention comprises: a mixer for performing frequency conversion of radar signals which enter the radar detector; a local-frequency sweeping circuit for varying the frequency of a local signal provided by a local signal generator within a given range of frequency; an FM detector circuit for performing FM detection of signals appearing at the output terminal of the mixer and for providing detection signals with their noise or high-frequency components suppressed; and a sweeping control circuit responsive to appearance of detection signals at the output terminal of the FM detector circuit for stopping the operation of the local-frequency sweeping circuit and for resuming the operation of the local-frequency sweeping circuit after the lapse of fixed lengths of time. While the local-frequency sweeping circuit is inoperative, the detection signal with its noise component suppressed appears at the output terminal of the FM detector circuit, and the prescribed radar signal can then be discriminated from other undesired radar or interference signals in terms of the length of time for which the noise-free detection signal lasts. Specifically, the length of time for which the noise-free detection signal lasts can be determined as follows: the signal from the FM detector is directed to a low-pass filter, thereby integrating the signal over time. The integrated signal appearing at the output terminal of the low-pass filter is compared with a fixed threshold value. If the integrated signal representing the length of detection time rises above the threshold value, it is used to drive an indicator such as a speaker or a luminescent diode for indicating the reception of a prescribed radar signal.

As will be understood from the above, a radar detector according to the present invention has a high capability of discrimination in spite of being of analogue type, completely eliminating interference signals of fluctuating frequency and maintaining the same high sensitivity to very faint radar signals as to strong radar signals.

BRIEF EXPLANATION OF THE DRAWINGS

Other objects and advantages of the present invention will be better understood from the following description of a preferred embodiment which is shown in the accompanying drawings.

DESCRIPTION OF THE PREFERRED EMBODIMENT

Figure 1:
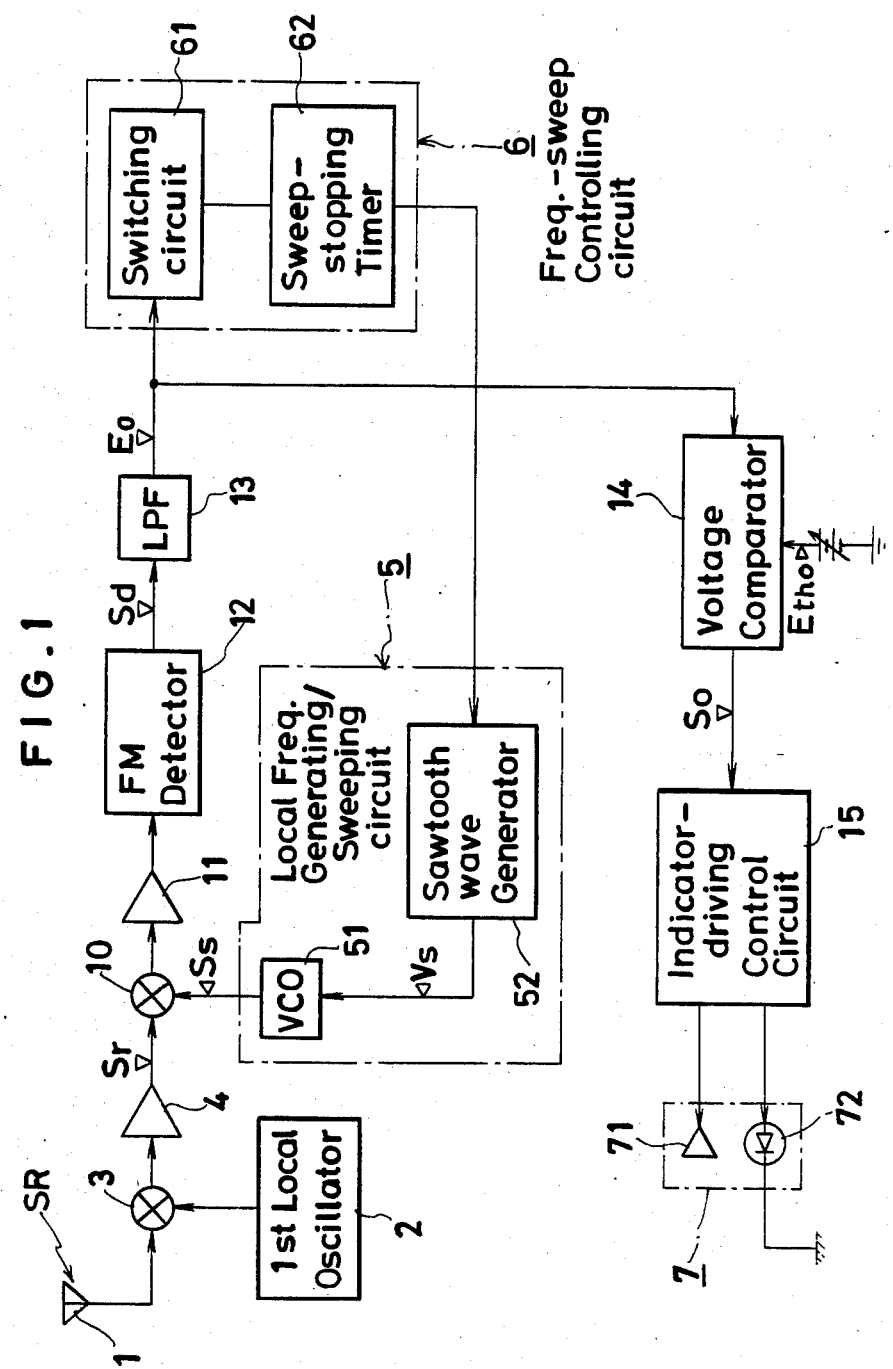
FIG. 1 shows a circuit diagram of a radar detector according to one embodiment of the present invention.

As already described, the present invention relates to a radar detector which is capable of discriminating a beam of radio-frequency energy transmitted by any of one or more prescribed radars from interference or extraneous signals which enter the radar detector. FIG. 1 shows a radar detector according to one embodiment of the present invention. The radar detector uses double-frequency conversion. A beam of radio-frequency energy SR transmitted by a specified radar enters a first mixer 3 through an antenna 1 to be mixed with a local signal of a fixed frequency generated by a first local oscillator 2. Then, a beat signal of reduced frequency Sr appears at the output terminal of the first mixer 3, and the beat signal Sr is amplified by an amplifier 4. As a matter of course, the beat signal Sr contains the same information as the prescribed radar signal SR which the antenna 1 receives. In this connection the beat signal Sr is regarded and treated hereinafter as a beam of radio-frequency energy transmitted by the prescribed radar or the prescribed radar signal SR to be detected.

The beat signal Sr is directed to a second mixer 10 via the amplifier 4. The second mixer 10 is connected to a local frequency generating-and-sweeping circuit 5 which is capable of providing a local signal Ss whose frequency varies over a receiving frequency band, repeatedly at regular periods.

The present invention can be equally well applied to a single-frequency conversion type radar detector not equipped with a first mixer such as indicated at 3 by providing its single mixer with a local oscillator which is capable of providing a local signal whose frequency varies over a receiving range of frequency repeatedly at regular periods. The signal appearing at the output terminal of the mixer 10 is directed to an FM detector circuit 12 via an amplifier 11, and the signal appearing at the output terminal of the FM detector circuit 12 is directed to a low-pass filter 13. The low-pass filter 13 selects direct current and low-frequency components Eo from a composite signal consisting of the prescribed radar signal Sr and a local oscillator signal Ss by eliminating high-frequency components from the composite signal.

The signal Eo appearing at the output terminal of the low-pass filter 13 is directed both to a frequency-sweep controlling circuit 6 and a voltage comparator 14. The frequency-sweep controlling circuit 6 is responsive to the rise of the output voltage signal Eo at the low-pass filter 13 for stopping the operation of the local frequency generating-and-sweeping circuit 5 for a predetermined length of time "t" and resuming operation of the local frequency generating-and-sweeping circuit 5.

On the other hand, the voltage comparator 14 compares the output voltage Eo appearing at the low-pass filter 13 with a given threshold or reference voltage Etho, and the comparator 14 outputs a radar-detecting signal So representing the arrival of a prescribed radar signal Sr when the output voltage Eo rises above the threshold voltage Etho.

The radar-detecting signal So is used for driving a drive control circuit 15 for an indicator 7 which is used for informing an operator of detection of a prescribed radar signal. The indicator and the drive control circuit used may be of any conventional structure appropriate for the purpose. For instance, a speaker 71 or a light-emitting diode 72 may be used as an indicator. As for the drive control circuit, it may be constructed so as to be responsive to the radar-detecting signal So for sending a sound-generating signal to the speaker 71, thereby causing the speaker 71 to generate a sound for a predetermined length of time. Otherwise, it may be constructed so as to be responsive to the radar-detecting signal So for causing the light-emitting diode 72 to flash on or flash on and off. Experts in the field will be able to combine timers, oscillators, amplifiers and other electric circuits into an indicator driving control appropriate for the purpose.

Figure 2:
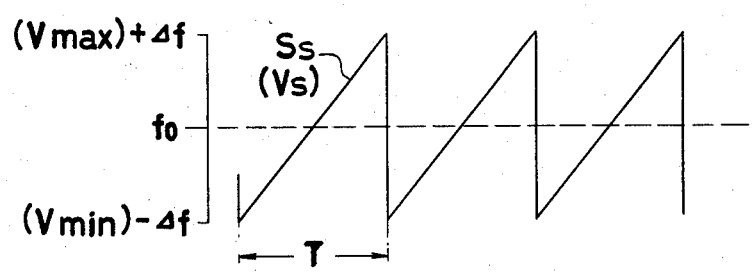
FIG. 2 shows a waveform representing the manner in which local frequency sweeping is performed.

The local frequency generating-and-sweeping circuit 5 is shown as comprising a sawtooth wave generator 52 and a voltage-controlled oscillator 51 which is designed to provide a local signal Ss whose frequency varies in proportion to the sweeping voltage Vs appearing at the output terminal of the sawtooth wave generator 52, as shown in FIG. 2.

Specifically the sweeping voltage Vs provided by the sawtooth wave generator 51 rises from the minimum voltage Vmin to the maximum voltage Vmax at a fixed rate and then suddenly falls from the maximum to the minimum voltage. This rise and fall is repeated at a fixed period T. Accordingly the frequency of the local signal varies between $fo - \Delta f$ and $fo + \Delta f$ repeatedly within each period. (Here "fo" stands for the center frequency of the range over which the local frequency may vary.) Thus, the local frequency Ss varies in the same way as the sawtooth voltage varies, and the receiving frequency range of the radar detector is $2\Delta f$ wide with respect to the desired radar signal Sr.

Assume that a stable beam of radio-frequency energy SR transmitted by the prescribed radar is received by the antenna 1 of the radar detector and that a corresponding stable radar signal Sr enters the mixer 10.

Figure 3A:
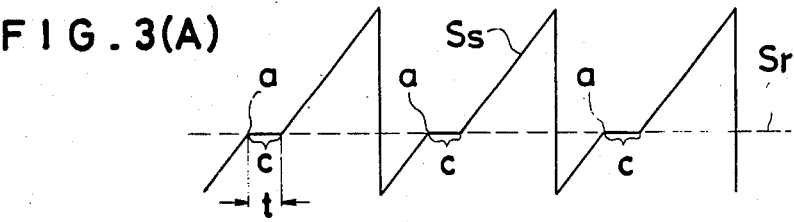
FIG. 3A shows a waveform representing how local frequency sweeping is affected by the reception of a prescribed radar signal.
Figure 4A:
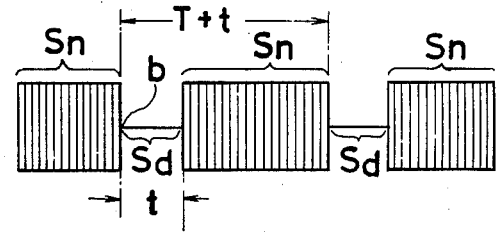
FIG. 4A shows the waveform of a signal appearing at the output terminal of the FM detector circuit on the reception of a prescribed radar signal.

As seen from FIG. 3A, when the prescribed radar signal Sr corresponds to the local signal Ss in frequency (see crossing time indicated at "a"), the signal Sd appearing at the output terminal of the FM detector circuit 12 will have no noise on high-frequency component Sn, and it will have only dc component Sd as indicated at "b" in FIG. 4A. In case that the prescribed radar signal Sr does not correspond to the local signal Ss in frequency, the beat signal whose frequency is equal to the difference between the desired radar signal Sr and the local signal Ss is composed of high-frequency component Sn whereas in case that the prescribed radar signal Sr corresponds to the local signal Ss in frequency, the FM detection signal Sd is composed of dc component only. The crossing point "a" is actually fairly wide, for instance, 10 MHz wide.

The FM detection signal is directed to the low-pass filter circuit 13, and then dc and low-frequency components Sd appear at the output terminal of the low-pass filter after elimination of high-frequency components Sn as shown in FIG. 4A. The output signal Eo is directed from the low-pass filter 13 to the frequency-sweep controlling circuit 6.

The frequency-sweep controlling circuit 6 is shown as comprising a switching circuit 61 and a timer circuit 62. The switching circuit 61 is designed to perform its switching action when the voltage Eo appearing at the output terminal of the low-pass filter 13 rises high enough to cross over a relatively small threshold value Eths of the switching circuit 61 (see FIG. 5A) whereas the timer circuit 62 is designed to stop the operation of the sawtooth wave generator 52 for as long as time "t" from the instant at which the output voltage Eo rises across the threshold voltage Etho, causing the sawtooth wave generator 52 to keep the sweeping voltage at a constant value Vs.

Figure 5A:
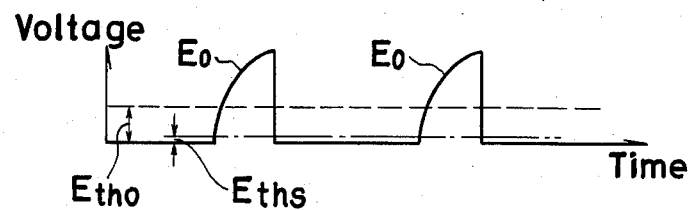
FIG. 5A shows the waveform of the signal appearing at the output terminal of the low-pass filter on the reception of a prescribed radar signal.

In operation, the detection signal Sd appears at time "b", and the voltage Eo begins to rise as shown by the solid line in FIG. 5A. The voltage Eo rises across the threshold value Eths soon after the time "bo", thereby causing the switching circuit 61 to perform its switching action, and putting the timer circuit 62 in operation. At that moment the sawtooth wave generator 52 in the local frequency generating-and-sweeping circuit 5 stops and consequently the local signal Ss provided by the voltage controlled oscillator 51 remains at the same frequency as at the time "a" (see FIG. 3) for the length of time set by the sweep-stopping timer 62 (see "c" in FIG. 3).

The prescribed radar signal Sr is stable, and the local signal Ss remains at the same frequency for the length of time "t" since the local signal corresponds to the prescribed radar signal Sr in frequency. Thus, the dc component detection signal Sd appears stably at the output terminal of the FM detection circuit 12 for the length of time "t" as shown in FIG. 4A.

As a consequence, the signal Eo appearing at the output terminal of the low-pass filter circuit 13 continues steadily to rise towards a given maximum value as shown in FIG. 5A.

On the other hand, the signal Eo is directed to the voltage comparator 14. When the output voltage Eo rises above the threshold value Etho of the voltage comparator 14, a radar detection signal So appears at the output terminal of the voltage comparator 14.

The radar detection signal So may be used to drive an indicator-driving control circuit 15, thereby permitting the operation of the indicator 7 in a desired mode as already described.

Assume that the radar detector momentarily receives an interference signal of radio-frequency.

Figure 3B:
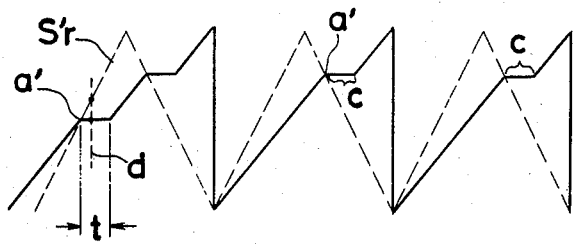
FIG. 3B shows a waveform representing how the local frequency sweeping is affected by the reception of an interference signal.

Also, assume that the interference signal Sr' varies in frequency within the receiving frequency range of the radar detector as indicated by the broken lines in FIG. 3B. Then, while the local signal Ss varies in frequency, it will come to correspond to the interference signal Sr' as indicated at a' in FIG. 3B, and at this time the noise on high-frequency signal Sn in FM detection will disappear and the dc component signal Sd' appears.

Figure 5B:
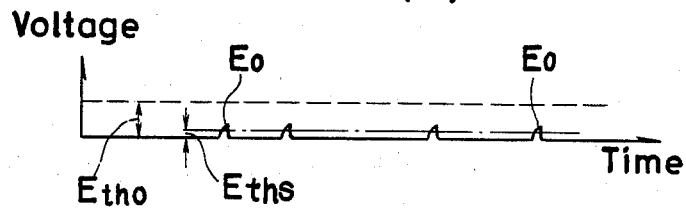
FIG. 5B shows the waveform of a signal appearing at the output terminal of the low-pass filter on the reception of an interference or extraneous signal.

Consequently, the signal Eo appearing at the output terminal of the low-pass filter 13 varies as shown in FIG. 5B. The threshold value Eths of the switching circuit 61 is set small enough to assure that the switching circuit 61 performs the same switching action as it does on reception of a prescribed radar signal. Therefore, the timer circuit 62, the sawtooth wave generator 52 and the voltage-controlled oscillator 51 perform the same individual operations one after another as they do on the reception of a prescribed radar signal. As a consequence, the frequency of the local signal Ss remains at a fixed value for the length of time "t" as indicated at "c" in FIG. 3B in the same way as in FIG. 3A.

The local signal generator temporarily stops its frequency sweeping, thus keeping the frequency of the local signal at a fixed value for the length of time "t", as is the case with the reception of the specified radar signal. In contrast to what happens on the reception of the prescribed radar signal, the frequency of the interference signal departs from the temporarily fixed frequency of the local signal soon after the coincidence of the interference signal Sr' with the fixed local signal Ss as indicated at "a" and "d" in FIG. 3B.

Figure 4B:
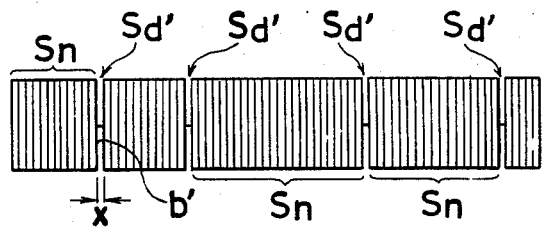
FIG. 4B shows the waveform of a signal appearing at the output terminal of the FM detector circuit on the reception of an interference or extraneous signal.

As a consequence, the detection signal Sd' appears only for a very short period "X" at the output terminal of the FM detector circuit 12 (see FIG. 4B). Therefore, the signal Eo appearing at the output terminal of the low-pass filter circuit 13 falls towards the minimum voltage immediately after having risen above the threshold voltage Eths of the switching circuit 61, keeping pace with the disappearance of the detection signal Sd' after the expiration of the very short time "X".

As is apparent from FIGS. 5A and 5B, on the reception of a prescribed radar signal Sr the signal Eo appearing at the output terminal of the low-pass filter circuit 13 rises to a relatively large value for the time "t" so that the local frequency sweeping is made to stop, whereas on the reception of an interference signal Sr' the signal Eo appearing at the output terminal of the low-pass filter circuit 13 rises to a relatively small value for only a fraction "X" of the period "t" for which the local frequency sweeping is made to stop. Thus, there is a big difference in amplitude between the signals Eo appearing at the output terminal of the low-pass filter circuit 13 on the reception of a prescribed radar signal and on the reception of an interference signal.

In this connection if the threshold voltage Etho for the comparator 14 is set at a fixed value between these different amplitudes of signals Eo, the signal Eo appearing on the reception of an interference signal cannot rise above the threshold voltage Etho, thereby assuring that the indicator means 7 is driven or energized only in detecting a prescribed radar signal. As a matter of course, the radar detection signal So appearing at the output terminal of the comparator 14 may be selectively set at either logical value "H" or "L".

As is apparent from the above, the central features of a radar detector according to the present invention reside in:

(1) stopping the local frequency sweeping for a fixed length of time "t" if signals Sr or Sr' corresponding to incoming signals and entering the mixer match with the local signal in frequency;

(2) watching how long the detection signal Sd appearing at the output terminal of the FM detector circuit 12 lasts during the inoperative period of the local frequency sweeping; and (3) deciding from the length of time the detection signal Sd lasts which signal is being received, a prescribed radar signal Sr or an interference signal Sr'. (Specifically it is decided that a prescribed radar signal Sr is being received on the appearance of an extended detection signal Sd and decided that an intereference signal Sr' is being received an appearance of a short detection signal Sd.)

In the embodiment described above the length of time for which incoming signals match the local signal in frequency is represented by the magnitude of a voltage. This should not be understood as limitative. The length of time can be represented by the magnitude of a current or any other physical quantity appropriate for the purpose.

The reasons for resuming the local frequency sweeping are: if a plurality of radio-frequency beams transmitted by a corresponding plurality of radars have been designated as prescribed signals, then unless the local frequency sweeping is resumed, i.e., the local signal is kept at the fixed frequency with which one of the incoming radar signals matches the radar detector will not be able to respond to and detect the other prescribed radar signals. Also, if a radar detector should tune in on a slowly undulating interference signal, then unless the local frequency sweeping is resumed, the radar detector will become completely occupied by detection of the interference signal.

The input part of the switching circuit 61 may be modified by providing a signal processing circuit appropriate for the purpose of expediting the switching action. Then, the switching circuit would be made responsive immediately to disappearance of noise or high-frequency components, without the delay which otherwise would be caused by the low-pass filter circuit 13.

Figure 6A:
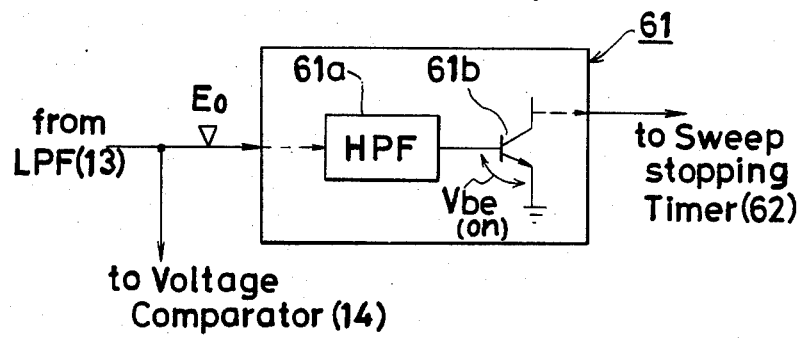
FIG. 6A shows a modification of the switching circuit for controlling the local-frequency sweeping control circuit.

In case that a signal Eo appearing at the terminal of the low-pass filter is applied to the switching circuit 61 as is in the embodiment advantageously the switching circuit 61 may be constructed as shown in FIG. 6A. Such construction is simple in arrangement and quite reliable in operation, reducing the tendency towards insensitivity to faint signals to the minimum possible.

As shown in FIG. 6A, the switching circuit comprises a high-pass filter 61a and an n-p-n switching transistor 61b. A voltage signal Eo from the low-pass filter 13 is differentiated by the high-pass filter 61a, and then, the differentiated signal is used to drive the switching transistor 61b into its conductive state. This circuit arrangement permits a pulse-like voltage signal Eo, which usually appears as the result of reception of an interference signal, to pass through the high-pass filter 61a. Also, it permits the leading or rising part of a voltage signal Eo, which appears as the result of reception of a prescribed radar signal, to pass through the high-pass filter 61b. As a matter of course these differentiated signals are of sufficient amplitude to cause the switching transistor 61b to turn on, thereby sending a pulse signal to the timer circuit 62 for stopping the local frequency sweeping for a fixed length of time. On the other hand, a voltage signal Eo which appears as the result of reception of a prescribed radar signal and continues to rise after the transient time has passed (see FIG. 5A), is directed to the voltage comparator 14, thus assuring reliable discrimination by the voltage comparator 14.

Figure 6B:
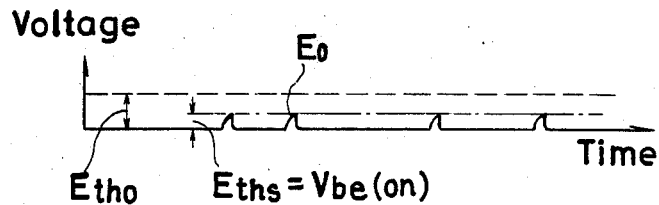
FIG. 6B shows a waveform representing the manner in which the switching circuit of FIG. 6A works.

The threshold voltage Eths for the switching circuit 61 of FIG. 5B correspond to the voltage Vbe(on) appearing between the base and emitter electrode of the switching transistor 61b at the time of turning on. Thus, the voltage signal Eo varies as shown in FIG. 6B. Specifically, the voltage signal Eo appearing as a result of reception of an interference signal is clipped at the threshold level Eths corresponding to the voltage Vbe(on) appearing between the base and emitter electrode of the conducting transistor. In FIG. 5A the threshold voltage Eths is equal to the voltage Vbe(on), and the voltage signal Eo is clipped momentarily at the time it crosses the threshold voltage level Eths.

The high-pass filter 61a may be of a conventional structure. The low-pass filter 13 may also be of a conventional structure. Preferably, it is of an active type which is easy to design for obtaining a desired filter transmission characteristic.

As is apparent from the above, a radar detector according to the present invention is of analogue type, is simple in structure, is reliable in discriminating operation even when it receives an interference signal which is in an integer multiple relation with a prescribed radar signal in frequency, and is able to maintain highly sensitivity at all times.

What is claimed is:

1. A radar detector comprising:
    a mixer for performing frequency-conversion of an incoming electromagnetic wave radar signal to a corresponding input frequency signal;
    a local-frequency sweeping circuit for providing to said mixer a local signal whose frequency varies with time in a fixed frequency range;
    an FM detector circuit for performing FM-detection on said input frequency signal, thereby providing a detection signal having higher-frequency or noise components therein, these components being suppressed when said input frequency signal matches said local signal in frequency;
    a frequency-sweep controlling circuit responsive to disappearance of said noise components in said detection signal for preventing said local-frequency sweeping circuit from continuing the frequency sweep for a fixed length of time; and
    means for distinguishing said incoming electromagnetic wave radar signal from interference signals on the basis of the lengths of time for which said noise components are suppressed in said detection signal during the temporary discontinuation of the frequency sweep in said local-frequency sweeping circuit.

2. A radar detector according to claim 1 further comprising: a low-pass filter connected to said FM detector circuit, thereby directing a signal to said frequency-sweep controlling circuit when a dc component appears in said detection signal with said noise components suppressed; and a voltage comparator for comparing an integration of said dc component with a predetermined threshold value and for providing a drive signal to said distinguishing means at the time of said integration rising above said threshold value.

3. A radar detector according to claim 2 wherein said frequency-sweep controlling circuit comprises a switching circuit for providing a signal in response to the increase of the output signal from said low-pass filter over a predetermined threshold value; and a timer responsive to the signal from said switching circuit for temporarily stopping the frequency sweep of said local-frequency sweeping circuit.

4. A radar detector according to claim 3 wherein said switching circuit includes a high-pass filter for differentiating the output signal from said low-pass filter; and a switching element responsive to the output signal from said high-pass filter for performing its switching action.

5. A radar detector according to claim 2 further comprising a voltage comparator responsive to the increase of the output signal from said low-pass filter over a predetermined threshold value for providing a radar detection signal, which may be used for driving an indicator.

6. A radar detector according to claim 3 further comprsing a voltage comparator responsive to the increase of the output signal from said low-pass filter over a predetermined threshold value for providing a radar detection signal, which may be used for driving an indicator.

7. a radar detector according to claim 5 wherein said indicator is composed of a light-emitting device.

8. A radar detector according to claim 5 wherein said indicator is composed of a sound-generating device.

* * * * *